US011300140B2

(12) United States Patent
Sakamoto et al.

(10) Patent No.: US 11,300,140 B2
(45) Date of Patent: Apr. 12, 2022

(54) COMPRESSOR WHEEL AND SUPERCHARGER

(71) Applicant: MITSUBISHI HEAVY INDUSTRIES ENGINE & TURBOCHARGER, LTD., Sagamihara (JP)

(72) Inventors: Keigo Sakamoto, Tokyo (JP); Shigeyoshi Sakuma, Tokyo (JP); Eigo Katou, Tokyo (JP); Masahiro Nakamura, Tokyo (JP); Takashi Arai, Tokyo (JP); Yusuke Furuta, Sagamihara (JP); Makoto Ozaki, Sagamihara (JP)

(73) Assignee: MITSUBISHI HEAVY INDUSTRIES ENGINE & TURBOCHARGER, LTD., Kanagawa (JP)

( * ) Notice: Subject to any disclaimer, the term of this patent is extended or adjusted under 35 U.S.C. 154(b) by 0 days.

(21) Appl. No.: 16/956,341

(22) PCT Filed: Dec. 25, 2017

(86) PCT No.: PCT/JP2017/046494
§ 371 (c)(1),
(2) Date: Jun. 19, 2020

(87) PCT Pub. No.: WO2019/130405
PCT Pub. Date: Jul. 4, 2019

(65) Prior Publication Data
US 2020/0318653 A1    Oct. 8, 2020

(51) Int. Cl.
*F04D 29/58* (2006.01)
*F02B 37/00* (2006.01)
*F04D 17/10* (2006.01)

(52) U.S. Cl.
CPC .......... *F04D 29/5853* (2013.01); *F02B 37/00* (2013.01); *F04D 17/10* (2013.01);
(Continued)

(58) Field of Classification Search
CPC .......... F01D 5/025; F01D 5/046; F01D 5/288; F02B 37/00; F02B 39/00; F02C 6/12;
(Continued)

(56) References Cited

U.S. PATENT DOCUMENTS 4,277,222 A * 7/1981 Barbeau ............... F01D 5/046
                                                    415/174.5
5,785,493 A * 7/1998 Ojima ............... F01D 11/122
                                                    415/174.1
(Continued)

FOREIGN PATENT DOCUMENTS

DE    44 17 095 A1    11/1995
EP    1 985 801 A1    10/2008
(Continued)

OTHER PUBLICATIONS

Extended European Search Report dated Aug. 14, 2020 issued to the corresponding European Application No. 17936117.5.
(Continued)

*Primary Examiner* — Jesse S Bogue
(74) *Attorney, Agent, or Firm* — Birch, Stewart, Kolasch & Birch, LLP

(57) ABSTRACT

A compressor wheel includes a compressor wheel body, and a thermal insulating coating layer disposed so as to cover at least a part of a back surface of the compressor wheel body.

5 Claims, 8 Drawing Sheets

(52) U.S. Cl.
CPC ....... *F05B 2220/40* (2013.01); *F05B 2240/30* (2013.01); *F05B 2260/231* (2013.01)

(58) Field of Classification Search
CPC .......... F02C 7/24; F04D 17/10; F04D 29/023; F04D 29/266; F04D 29/284; F04D 29/30; F04D 29/5853; F05B 2220/40; F05B 2240/30; F05B 2260/231; F05D 2220/40; F05D 2230/642; F05D 2260/31; F05D 2260/37; F05D 2300/12; F05D 2300/121; F05D 2300/2102; F05D 2300/211; F05D 2300/437; F05D 2300/44; F05D 2300/5024; F05D 2300/61
See application file for complete search history.

(56) References Cited

U.S. PATENT DOCUMENTS

| | | | | |
|---|---|---|---|---|
| 8,801,412 | B2* | 8/2014 | Ikeda | C10M 169/04 418/178 |
| 9,453,509 | B2* | 9/2016 | Horibe | F16C 33/121 |
| 10,502,263 | B2* | 12/2019 | Wood | F01D 25/18 |
| 2010/0215506 | A1* | 8/2010 | Heyes | F01D 11/02 416/241 R |
| 2018/0045215 | A1* | 2/2018 | Arai | F04D 29/284 |
| 2020/0166052 | A1* | 5/2020 | Yokoyama | F04D 29/284 |

FOREIGN PATENT DOCUMENTS

| | | | |
|---|---|---|---|
| JP | 11-141304 | A | 5/1999 |
| JP | 2000-291441 | A | 10/2000 |
| JP | 2010-506091 | A | 2/2010 |
| JP | 2014-122582 | A | 7/2014 |
| JP | 2014-211127 | A | 11/2014 |
| JP | 2016-89731 | A | 5/2016 |
| WO | WO 2016/151793 | A1 | 9/2016 |
| WO | WO 2017/168648 | A1 | 10/2017 |

OTHER PUBLICATIONS

Office Action dated Apr. 20, 2021 issued in counterpart Japanese Application No. 2019-561412 with a Machine Translation.
International Preliminary Report on Patentability and Written Opinion of the International Searching Authority with an English translation, dated Jul. 9, 2020, for International Application No. PCT/JP2017/046494.
International Search Report, dated Feb. 13, 2018, for International Application No. PCT/JP2017/046494.

* cited by examiner

COMPRESSOR WHEEL AND SUPERCHARGER

TECHNICAL FIELD

The present disclosure relates to a compressor wheel and a supercharger including the compressor wheel.

BACKGROUND

Superchargers include, for example, a turbocharger which supercharges an engine (internal combustion engine) of an automobile or a ship for the purpose of improving the output of the engine. The turbocharger uses energy of high-temperature exhaust gas discharged from the engine to rotate a turbine wheel and a compressor wheel connected to the turbine wheel via a rotational shaft so that gas such as air is compressed by the compressor wheel and the compressed air is supplied (supercharged) to the engine.

The compressor wheel of such a turbocharger is required to have high strength and high stiffness but light weight to reduce energy loss. On the other hand, since the compressor wheel is not required to have strength in high temperature compared with the turbine wheel exposed to high-temperature exhaust gas discharged from the engine, aluminum alloy meeting the above requirements is widely used as the material of the compressor wheel (for example, see Patent Document 1).

CITATION LIST

Patent Literature

Patent Document 1: WO2016/151793A

SUMMARY

Problems to be Solved

In recent years, the turbocharger is required to rotate at higher speed in order to meet demands for engine downsizing and high output power. However, when the rotational speed of the compressor wheel increases, the amount of heat generated by the compression of air increases, and the temperature of the compressor wheel during rotation increases. Further, when the rotational speed of the compressor wheel increases, the centrifugal stress of the compressor wheel increases. Accordingly, when the rotational speed of the compressor wheel increases, significant creep damage may occur in the compressor wheel, so that the compressor wheel is likely to be damaged. In addition, the compressor wheel is generally fastened by screwing nuts with the rotational shaft being inserted thereto. If high centrifugal force is continuously applied to the compressor wheel in a high temperature environment, the compressor wheel may contract in the axial direction of the rotational shaft due to creep deformation. This results in a reduction in force for fastening the compressor wheel. The reduction in fastening force may decrease the compressor wheel efficiency and cause damage to the compressor wheel.

Patent Document 1 discloses a compressor impeller (compressor wheel) coated with an electroless plating of Ni—P based alloy. The electroless plating aims to prevent erosion due to droplets contained in exhaust gas produced in the compressor impeller, but does not solve the above problems.

In view of the above, an object of at least one embodiment of the present invention is to provide a compressor wheel that can suppress the increase in temperature of the compressor wheel, reduce creep damage of the compressor wheel, and suppress the reduction in fastening force, and a supercharger including the compressor wheel.

Solution to the Problems (1) A compressor wheel according to at least one embodiment of the present invention comprises: a compressor wheel body; and a thermal insulating coating layer disposed so as to cover at least a part of a back surface of the compressor wheel body.

The present inventors have found, as a result of investigation, that the temperature increase of the compressor wheel is caused when heat generated by friction between the compressor wheel and the air around a back surface of the compressor wheel during high-speed rotation of the compressor wheel is input from the back surface of the compressor wheel.

In the above configuration (1), the compressor wheel includes the compressor wheel body and the thermal insulating coating layer disposed so as to cover at least a part of the back surface of the compressor wheel body. Thus, even when the air around the back surface of the compressor wheel is heated to very high temperature due to heat generated by friction between the compressor wheel and the air around the back surface of the compressor wheel as a result of high-speed rotation of the compressor wheel, the thermal insulating coating layer reduces input of heat from the back surface of the compressor wheel body. Further, since the heat input from the back surface of the compressor wheel body is reduced, the temperature increase of the compressor wheel body is suppressed. Thus, it is possible to suppress creep damage of the compressor wheel and the reduction in fastening force.

(2) In some embodiments, in the above configuration (1), the compressor wheel body is made of aluminum or an aluminum alloy.

With the above configuration (2), since the compressor wheel body is made of aluminum or an aluminum alloy, the compressor wheel body is light compared with that made of other materials such as iron. On the other hand, when the temperature of the compressor wheel body made of aluminum or an aluminum alloy becomes higher than, for example, 200° C., creep damage and the reduction in fastening force may become remarkable, and the compressor wheel body may be damaged. In this regard, the thermal insulating coating layer suppresses the temperature increase of the compressor wheel body, so that it is possible to prevent damage to the compressor wheel body.

(3) In some embodiments, in the above configuration (1) or (2), the thermal insulating coating layer is disposed outside of two-thirds of an external dimension of the back surface of the compressor wheel body in a direction perpendicular to an axial direction of the compressor wheel.

With the above configuration (3), the portion located outside of two-thirds of the external dimension of the back surface of the compressor wheel body is where the temperature remarkably increases due to heat input from the air around the back surface of the compressor wheel, but the thermal insulating coating layer is disposed on this portion, so that it is possible to effectively reduce heat input from the back surface of the compressor wheel body.

(4) In some embodiments, in the above configuration (1) or (2), the back surface of the compressor wheel body includes a flat surface including a contact portion configured to come into contact with a retaining portion of a rotational shaft when the compressor wheel is attached to the rotational shaft, and the thermal insulating coating layer is disposed on the entire back surface except the flat surface.

With the above configuration (4), since the thermal insulating coating layer is disposed on not only the portion where the temperature remarkably increases due to heat input from the air around the back surface of the compressor wheel but over the entire back surface except the flat surface, it is possible to reliably reduce heat input from the back surface of the compressor wheel body.

(5) In some embodiments, in any one of the above configurations (1) to (4), the thermal insulating coating layer is made of a resin.

With the above configuration (5), a resin material excellent in thermal insulating property but relatively inexpensive and easily available is used for the thermal insulating coating layer.

(6) In some embodiments, in any one of the above configurations (1) to (5), the thermal insulating coating layer has a thermal conductivity of equal to or less than 2.0 W/mK.

With the above configuration (6), since the thermal conductivity of the thermal insulating coating layer is equal to or less than 2.0 W/mK, it is possible to effectively reduce heat input from the back surface of the compressor wheel body. Further, it is possible to prevent the thickness of the thermal insulating coating layer from increasing.

(7) A supercharger according to at least one embodiment of the present invention comprises: the compressor wheel described in any one of the above (1) to (6); a rotational shaft having a longitudinal direction, one end of the rotational shaft in the longitudinal direction being inserted in a through hole formed in the compressor wheel from the back surface of the compressor wheel, the rotational shaft having a retaining portion in contact with the back surface of the compressor wheel; a retaining member retained by the one end of the rotational shaft so that the compressor wheel is clamped between the retaining member and the retaining portion; and a compressor cover accommodating the compressor wheel.

In the above configuration (7), the compressor wheel of the supercharger is clamped between the retaining portion of the rotational shaft and the retaining member, and is accommodated in the compressor cover. In such a compressor wheel, when the temperature of the compressor wheel body becomes higher than, for example, 200° C., the reduction in force for clamping the compressor wheel between the retaining portion of the rotational shaft and the retaining member (fastening force) and creep damage may become remarkable, and the compressor wheel body may be damaged. In this regard, the thermal insulating coating layer suppresses the temperature increase of the compressor wheel body, so that it is possible to prevent damage to the compressor wheel body.

Advantageous Effects

At least one embodiment of the present invention provides a compressor wheel that can suppress the increase in temperature of the compressor wheel, reduce creep damage of the compressor wheel, and suppress the reduction in fastening force, and a supercharger including the compressor wheel.

DETAILED DESCRIPTION

Figure 1:
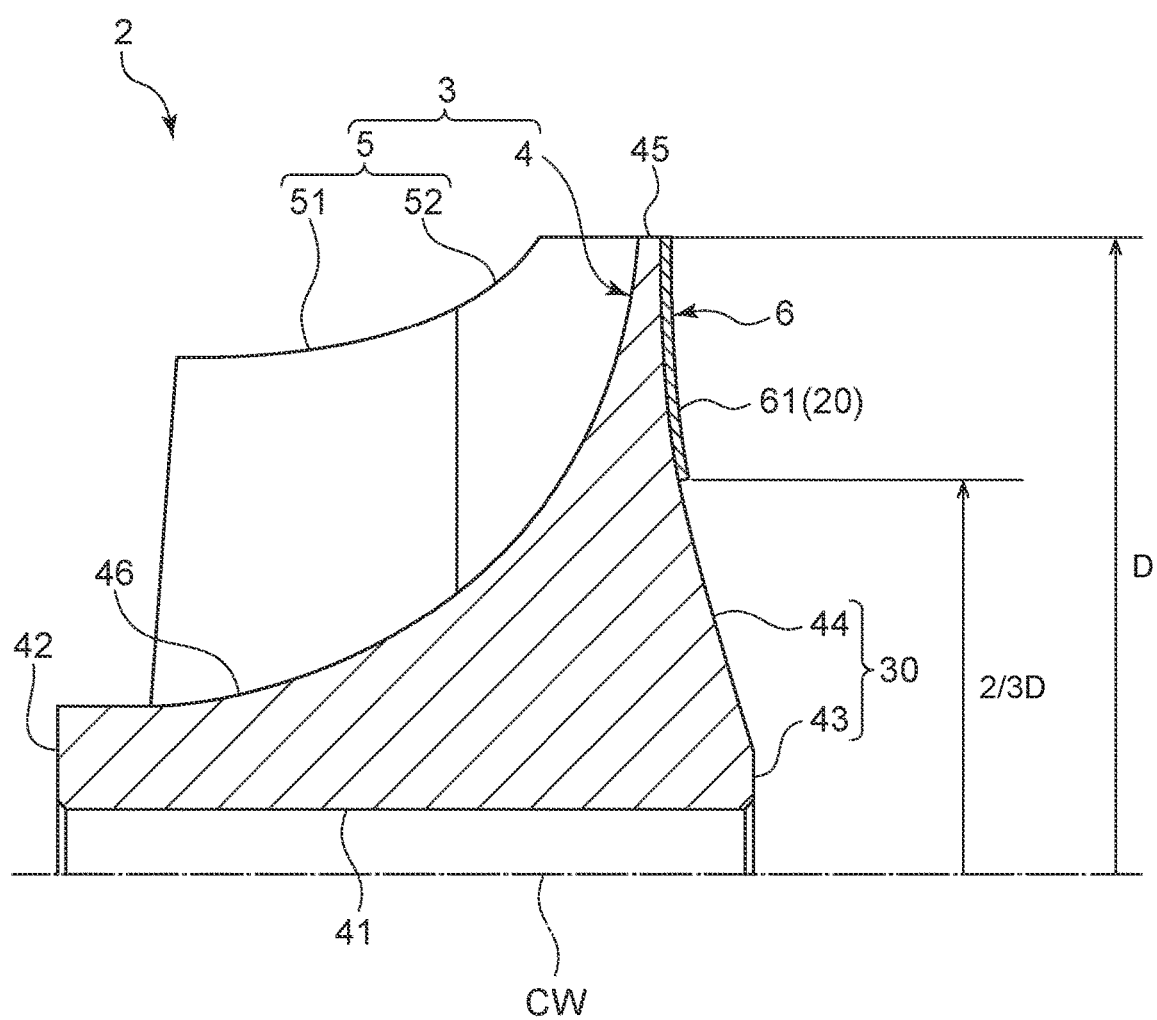
FIG. 1 is a schematic half cross-sectional view of a compressor wheel taken along the axial direction of the compressor wheel for describing the compressor wheel according to an embodiment of the present invention.

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

FIG. 1 is a schematic half cross-sectional view of a compressor wheel taken along the axial direction of the compressor wheel for describing the compressor wheel according to an embodiment of the present invention. FIG.

2 is a schematic cross-sectional view of a supercharger including a compressor wheel according to an embodiment of the present invention.

Figure 2:
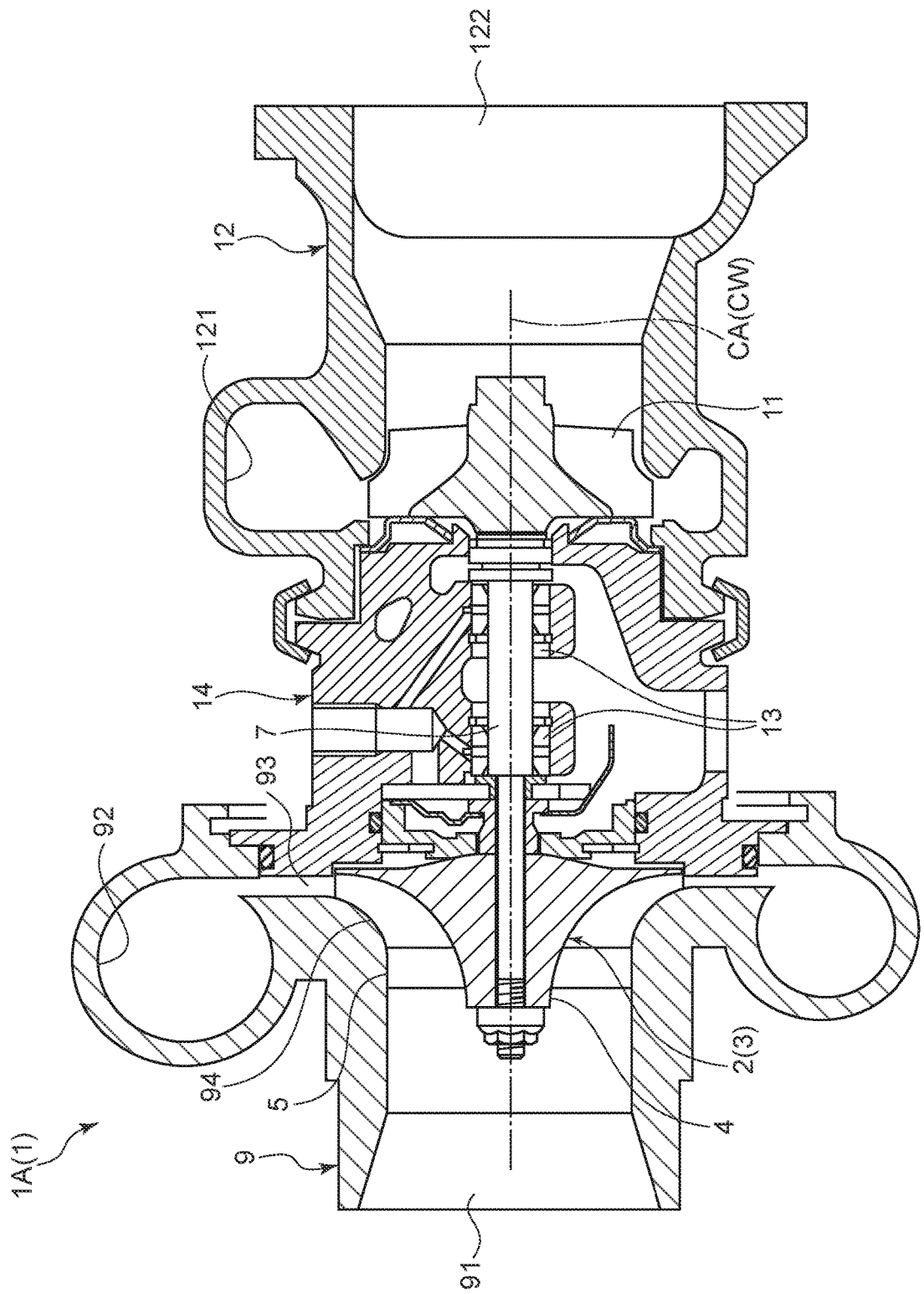
FIG. 2 is a schematic cross-sectional view of a supercharger including a compressor wheel according to an embodiment of the present invention.

The supercharger 1 according to some embodiments shown in FIGS. 1 to 8 includes, as shown in FIG. 2, a rotational shaft 7 extending along the axial direction (right-left direction in the figure) in which the axis CA of the rotational shaft 7 extends, a compressor wheel 2 disposed at one end of the rotational shaft 7 in the axial direction (left end in the figure), and a compressor cover 9 accommodating the compressor wheel 2 rotatably. As shown in FIG. 2, the supercharger 1 is a turbocharger 1A for an automobile, and further includes a turbine wheel 11 disposed at the other end of the rotational shaft 7 in the axial direction (right end in the figure), a turbine housing 12 accommodating the turbine wheel 11 rotatably, and a bearing housing 14 accommodating a bearing 13 which rotatably supports the rotational shaft 7. As shown in FIG. 2, the bearing housing 14 is disposed between the compressor cover 9 and the turbine housing 12 in the axial direction of the rotational shaft 7, and is fixed to the compressor cover 9 and the turbine housing 12, for example, by screwing bolts.

The compressor cover 9 has a diffuser 93 formed on the outer peripheral side of the compressor wheel 2 as away from an air inlet 91 in the axial direction and extending along a direction perpendicular to the axis CA of the rotational shaft 7, as shown in FIG. 2. The compressor cover 9 has a spiral compressor flow passage 92 formed on the outer peripheral side of the diffuser 93. Further, the compressor cover 9 has a shroud portion 94 covering compressor blades 5 of the compressor wheel 2. The shroud portion 94 is formed so as to be continuous with the diffuser 93 between the diffuser 93 and the air inlet 91 in the axial direction.

In the turbocharger 1A, as shown in FIG. 2, high-temperature exhaust gas discharged from an engine (internal combustion engine) (not depicted) is fed to the turbine wheel 11 through a turbine flow passage 121 formed in the turbine housing 12 to rotationally drive the turbine wheel 11 around the axis CA. The exhaust gas used to rotationally drive the turbine wheel 11 is discharged from an exhaust gas outlet 122 formed in the turbine housing 12. Since the compressor wheel 2 is connected to the turbine wheel 11 via the rotational shaft 7, the compressor wheel 2 is rotationally driven around the axis CA in conjunction with rotation of the turbine wheel 11.

The compressor wheel 2 rotationally driven sucks engine combustion air (gas) from the air inlet 91 formed in the compressor cover 9, and causes the air to flow inside the compressor cover 9 along the axial direction. The air flows between multiple compressor blades 5 of the rotationally driven compressor wheel 2 to increase the dynamic pressure, and then flows into the diffuser 93 located on the radially outer side so that the dynamic pressure is partially converted into static pressure to increase the pressure. In this state, the air is fed into a combustion chamber of the engine through the compressor flow passage 92. Such a turbocharger 1A increases the output of the engine by increasing the combustion efficiency of the engine.

The compressor wheel 2 of the turbocharger 1A includes, as shown in FIG. 1, a compressor wheel body 3 and a thermal insulating coating layer 6 disposed so as to cover at least a part of a back surface 30 of the compressor wheel body 3. The compressor wheel body 3 is made of aluminum or an aluminum alloy. Further, as shown in FIG. 1, the compressor wheel body 3 includes a hub 4 and a compressor blade 5 disposed so as to protrude outward in the radial direction (direction perpendicular to the axial direction) from the outer periphery of the hub 4.

As shown in FIG. 1, the hub 4 is formed in a conical shape with an external dimension gradually increasing from a tip surface 42, which is one end surface in the axial direction (left-right direction in the figure) coinciding with the axis CW of the compressor wheel body 3, to a flat surface 43, which is the other end surface. The tip surface 42 and the flat surface 43 of the hub 4 extend along the radial direction. Further, the hub 4 has a through hole 41 passing centrally through the tip surface 42 and the flat surface 43 along the axis CW. The axis CW of the compressor wheel body 3 is on the same line as the axis CA of the rotational shaft 7, as shown in FIG. 2.

As shown in FIG. 1, the hub 4 has an outer surface 45 with a maximum and constant external dimension in the radial direction adjacent to the flat surface 43 in the axial direction of the compressor wheel body 3, and a blade-side inclined surface 46 connected with the tip surface 42 and the outer surface 45 between the tip surface 42 and the outer surface 45 in the axial direction. The blade-side inclined surface 46 is shaped such that the external dimension gradually increases and the inclination angle with respect to the axis CW gradually increases from the tip surface 42 to the outer surface 45 in the axial direction of the compressor wheel body 3.

Further, as shown in FIG. 1, the hub 4 has a back-side inclined surface 44 connected with the flat surface 43 and the outer surface 45 between the flat surface 43 and the outer surface 45 in the axial direction. The back-side inclined surface 44 is shaped such that the distance from the flat surface 43 in the axial direction increases on the radially outer side, and the slope becomes gentle on the radially outer side. As shown in FIG. 1, the back surface 30 of the compressor wheel body 3 is composed of the flat surface 43 and the back-side inclined surface 44 of the hub 4.

The compressor blade 5 includes, as shown in FIG. 1, a full blade 51 disposed so as to protrude radially outward from the blade-side inclined surface 46 and a splitter blade 52 disposed so as to protrude radially outward from the blade-side inclined surface 46 and shorter than the full blade 51 in the axial direction.

Figure 3:
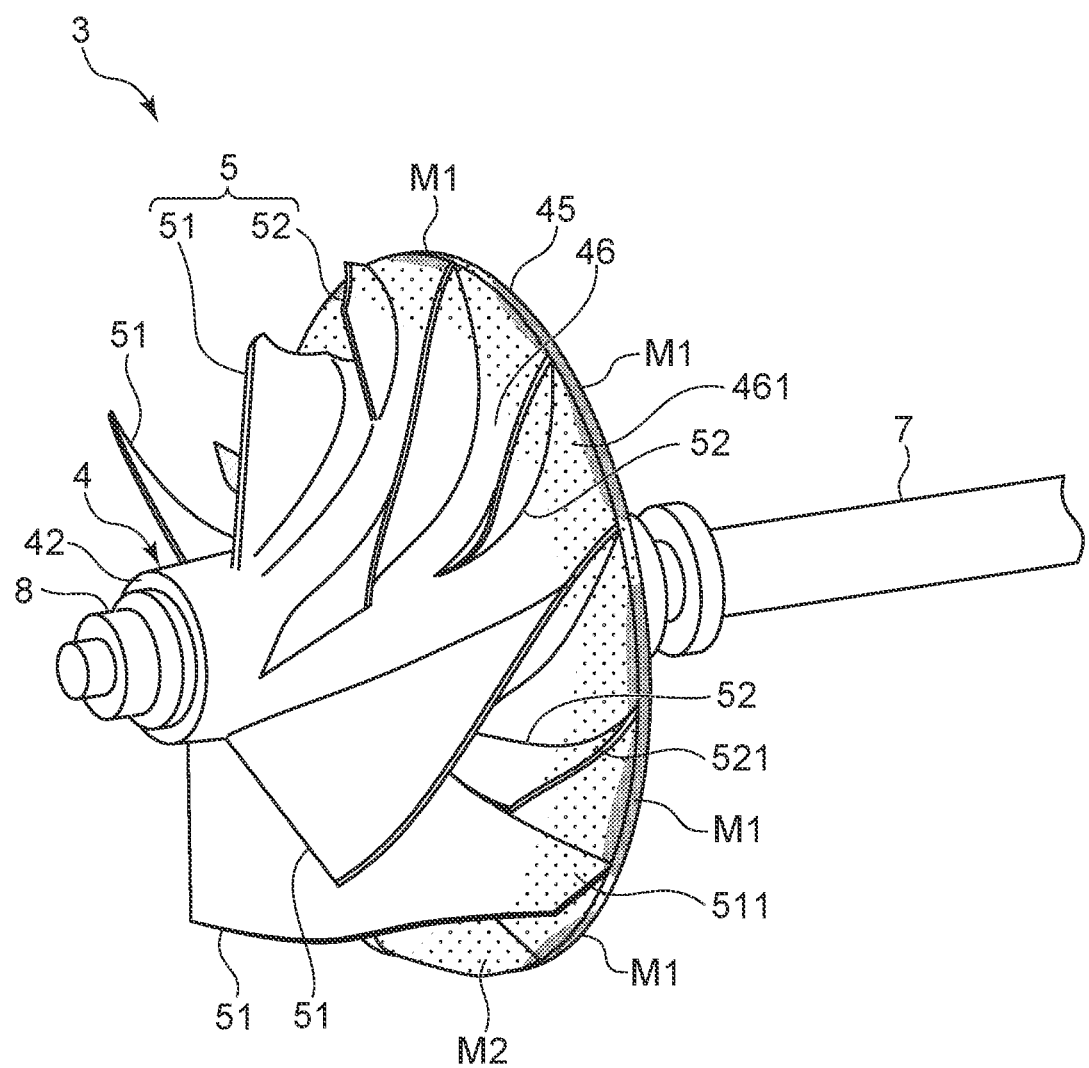
FIG. 3 is a perspective view of the compressor wheel shown in FIG. 1 when the compressor wheel is attached to a rotational shaft.
Figure 4:
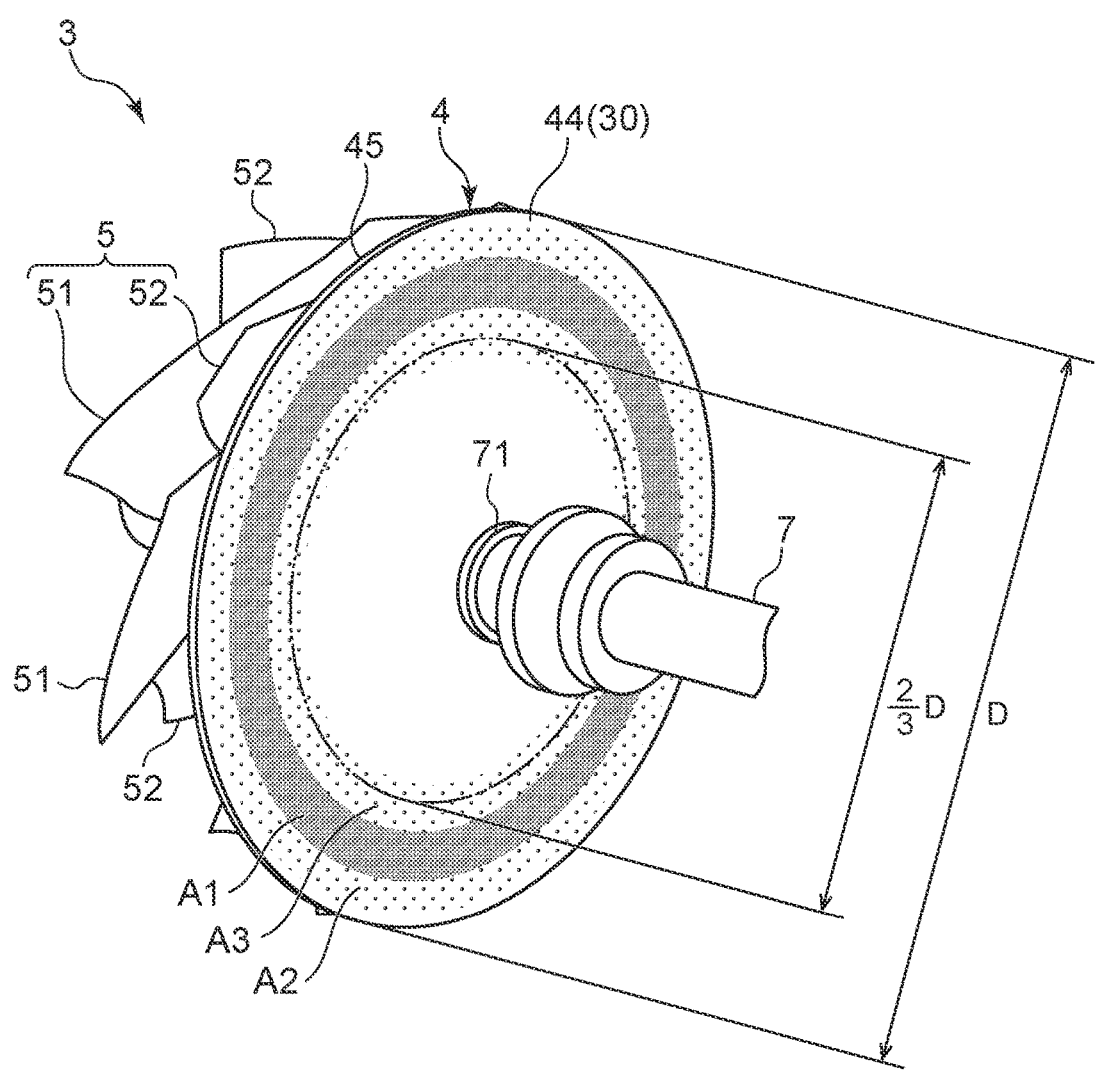
FIG. 4 is a perspective view of the compressor wheel attached to the rotational shaft shown in FIG. 3, viewed from another direction.

FIG. 3 is a perspective view of the compressor wheel shown in FIG. 1 when the compressor wheel is attached to a rotational shaft. FIG. 4 is a perspective view of the compressor wheel attached to the rotational shaft shown in FIG. 3, viewed from another direction. As shown in FIG. 3, the full blades 51 and the splitter blades 52 are alternately arranged in the circumferential direction of the hub 4, and each is formed in a plate shape three-dimensionally curved and inclined so as to form a part of spiral in a radial manner. Further, ends of the full blades 51 and the splitter blades 52 closer to the flat surface 43 in the axial direction are continuous with the outer surface 45 of the hub 4.

Figure 5:
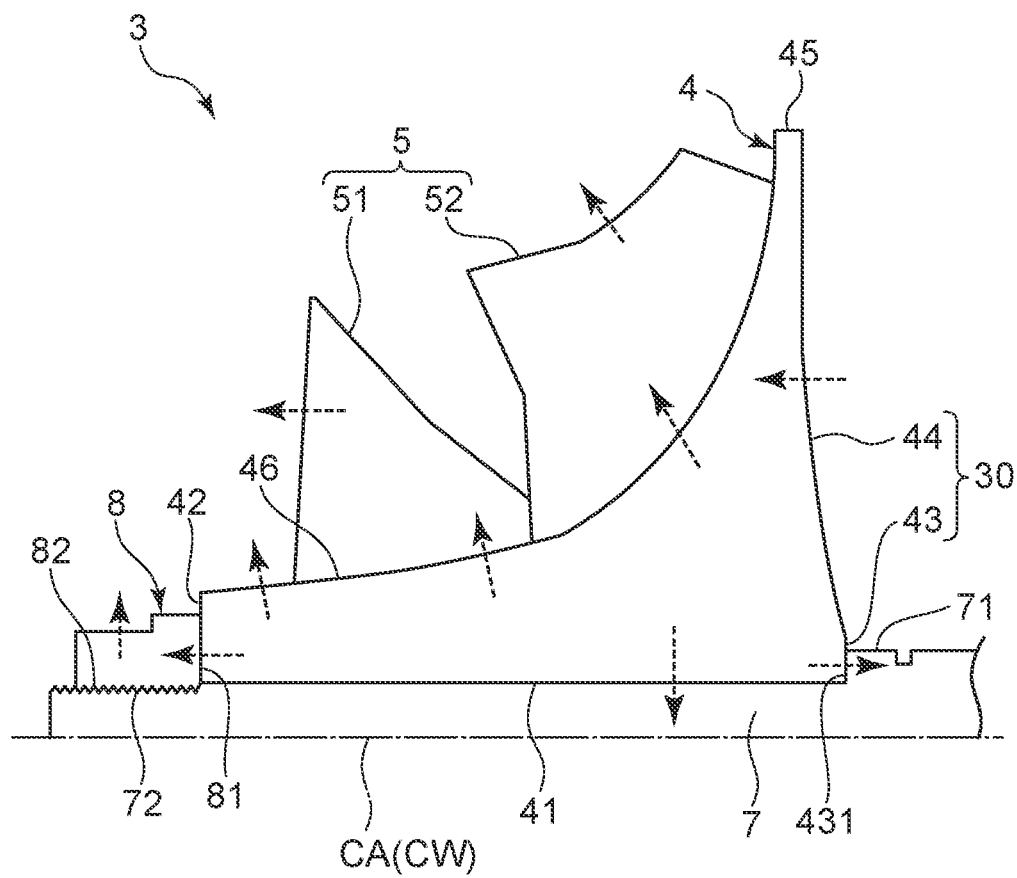
FIG. 5 is a schematic half cross-sectional view of a compressor wheel attached to a rotational shaft, for describing heat transfer of the compressor wheel having no thermal insulating coating layer shown in FIG. 1.

FIG. 5 is a schematic half cross-sectional view of a compressor wheel attached to a rotational shaft, for describing heat transfer of the compressor wheel having no thermal insulating coating layer shown in FIG. 1. As shown in FIG. 5, one end of the rotational shaft 7 in the axial direction (longitudinal direction) is inserted into the through hole 41 formed in the compressor wheel body 3 from the back surface 30 of the compressor wheel body 3. The rotational shaft 7 has a retaining portion 71 protruding radially outward. The retaining portion 71 is configured to come into contact with at least a part (contact portion 431) of the flat surface 43 of the compressor wheel body 3. Further, a male thread portion 72 is formed on the outer periphery of a tip portion of the rotational shaft 7 inserted in the through hole 41.

As shown in FIG. 5, a retaining member 8 includes a nut, and is formed in an annular shape with a female thread portion 82 on the inner periphery. The compressor wheel body 3 is fastened to the rotational shaft 7 by screwing the male thread portion 72 of the rotational shaft 7 with the female thread portion 82 of the retaining member 8 in a state where the contact portion 431 is in contact with the retaining portion 71 of the rotational shaft 7. In other words, as shown in FIG. 5, by screwing the female thread portion 82 with the male thread portion 72 of the rotational shaft 7, a retaining surface 81 of the retaining member 8 is retained by one end of the rotational shaft 7, and the compressor wheel body 3 is clamped between the retaining member 8 and the retaining portion 71 of the rotational shaft 7.

The present inventors have found, as a result of investigation, that the temperature increase of the compressor wheel 2 is caused when heat generated by friction between the compressor wheel 2 and the air around a back surface 20 of the compressor wheel 2 during high-speed rotation of the compressor wheel 2 is input from the back surface 20 of the compressor wheel 2.

The arrow shown by the dotted line in FIG. 5 indicates the flow of heat of the compressor wheel body 3. As shown in FIG. 5, heat generated by friction between the compressor wheel 2 and the air around the back surface 20 of the compressor wheel 2 is input from the back-side inclined surface 44 (back surface 30) of the compressor wheel body 3. Most of the heat input from the back-side inclined surface 44 is radiated from the blade-side inclined surface 46 of the hub 4 directly, or is transferred from the blade-side inclined surface 46 to the full blade 51 or the splitter blade 52, and then radiated from the full blade 51 or the splitter blade 52 to the outside of the compressor wheel body 3. A part of the heat input from the back-side inclined surface 44 is transferred to the rotational shaft 7 or the retaining member 8 and then radiated.

When the thermal insulating coating layer 6 is not disposed on the back surface 30 of the compressor wheel body 3, the temperature of the compressor wheel body 3 increases. The high-temperature region M1 and the quasi-high-temperature region M2 shown in FIG. 3 are regions where the temperature of the compressor wheel body 3 becomes higher than that in the other portions during rotational driving of the compressor wheel body 3 when the thermal insulating coating layer 6 is not provided. The high-temperature region M1 is a region of higher temperature than the quasi-high temperature region M2. As shown in FIG. 3, the high-temperature region M1 and the quasi-high-temperature region M2 are formed on the outer surface 45 of the compressor wheel body 3, an outer peripheral edge portion 461 of the blade-side inclined surface 46 located in the vicinity of the outer surface 45, and root portions 511, 512 of the full blade 51 and the splitter blade 52 located in the vicinity of the outer surface 45.

Accordingly, when the compressor wheel body 3 having no thermal insulating coating layer 6 is rotationally driven at high speed, the root portions 511, 512 of the full blade 51 and the splitter blade 52 in the vicinity of the outer surface 45 are heated, so that creep damage may occur in the root portions 511, 512. Moreover, since the outer surface 45 of the compressor wheel body 3 and the outer peripheral edge portion 461 of the blade-side inclined surface 46 are heated, the compressor wheel body 3 expands outward in the radial direction and contracts in the axial direction by creep deformation due to centrifugal force of the compressor wheel body 3. Therefore, the fastening force for clamping the compressor wheel body 3 between the retaining member 8 and the retaining portion 71 of the rotational shaft may decrease.

The high-temperature region A1 and the quasi-high-temperature regions A2, A3 shown in FIG. 4 are regions where the air temperature (atmospheric temperature) is higher than that in the other portions during rotational driving of the compressor wheel body 3. The high-temperature region A1 is a region of higher temperature than the quasi-high-temperature region A2 disposed on the outer side of the high-temperature regions A1 in the radial direction of the rotational shaft 7, and the quasi-high-temperature region A3 disposed on the inner side of the high-temperature regions A1 in the radial direction of the rotational shaft 7. As shown in FIG. 4, most of the high-temperature region A1, the quasi-high-temperature region A2, and the quasi-high-temperature region A3 are located radially outside of two-thirds of the external dimension D of the back surface 30 of the compressor wheel body 3 and radially inside the external dimension D. Therefore, the portion located radially outside of two-thirds of the external dimension D of the back surface 30 of the compressor wheel body 3 and radially inside the external dimension D is where the temperature remarkably increases due to heat input from the air around the back surface 30 of the compressor wheel body 3.

The thermal insulating coating layer 6 is provided in order to suppress input of heat from the back-side inclined surface 44 (back surface 30) of the compressor wheel body 3. In the embodiment shown in FIG. 1, the thermal insulating coating layer 6 is disposed outside of two-thirds of the external dimension D of the back surface 30 of the compressor wheel body 3 in a direction perpendicular to the axial direction of the compressor wheel 2. The back surface 20 of the compressor wheel 2 includes, as shown in FIG. 1, the back surface 30 of the compressor wheel body 3 on which the thermal insulating coating layer 6 is not disposed, and a surface 61 of the thermal insulating coating layer 6 opposite to a surface facing the back surface 30 of the compressor wheel body 3. The thermal insulating coating layer 6 is not provided on the outer surface 45 and the blade-side inclined surface 46 of the compressor wheel body 3 so as not to prevent heat radiation from the compressor wheel body 3.

Figure 6:
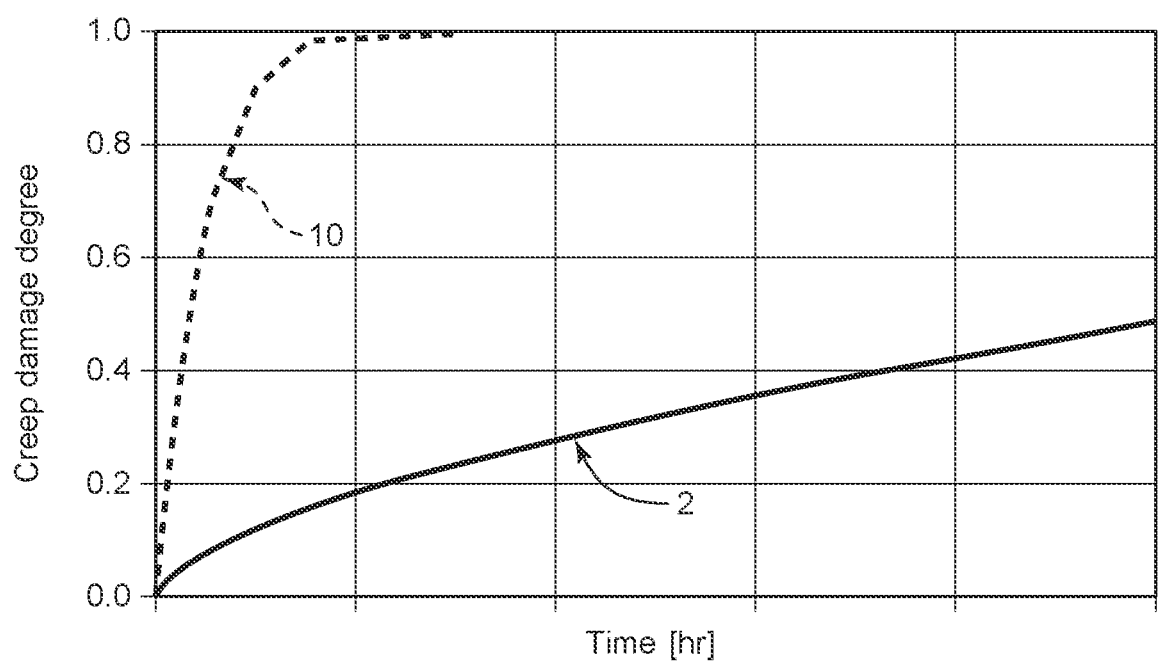
FIG. 6 is a graph showing change in degree of creep damage of a compressor wheel according to an embodiment of the present invention over time, in comparison with a compressor wheel according to comparative example.

FIG. 6 is a graph showing change in degree of creep damage of a compressor wheel according to an embodiment of the present invention over time, in comparison with a compressor wheel according to comparative example. In the graph shown in FIG. 6, the horizontal axis represents the rotational drive time of the compressor wheel, and the vertical axis represents the creep damage degree of the compressor wheel. Further, the compressor wheel 2 including the thermal insulating coating layer 6 is indicated by the solid line in FIG. 6, and the compressor wheel 10 according to comparative example composed of the compressor wheel body 3 not including the thermal insulating coating layer 6 is indicated by the dotted line in FIG. 6. As shown in FIG. 6, the compressor wheel 2 can suppress the increase in creep damage degree for a long period compared with the compressor wheel 10 according to the comparative example.

Figure 7:
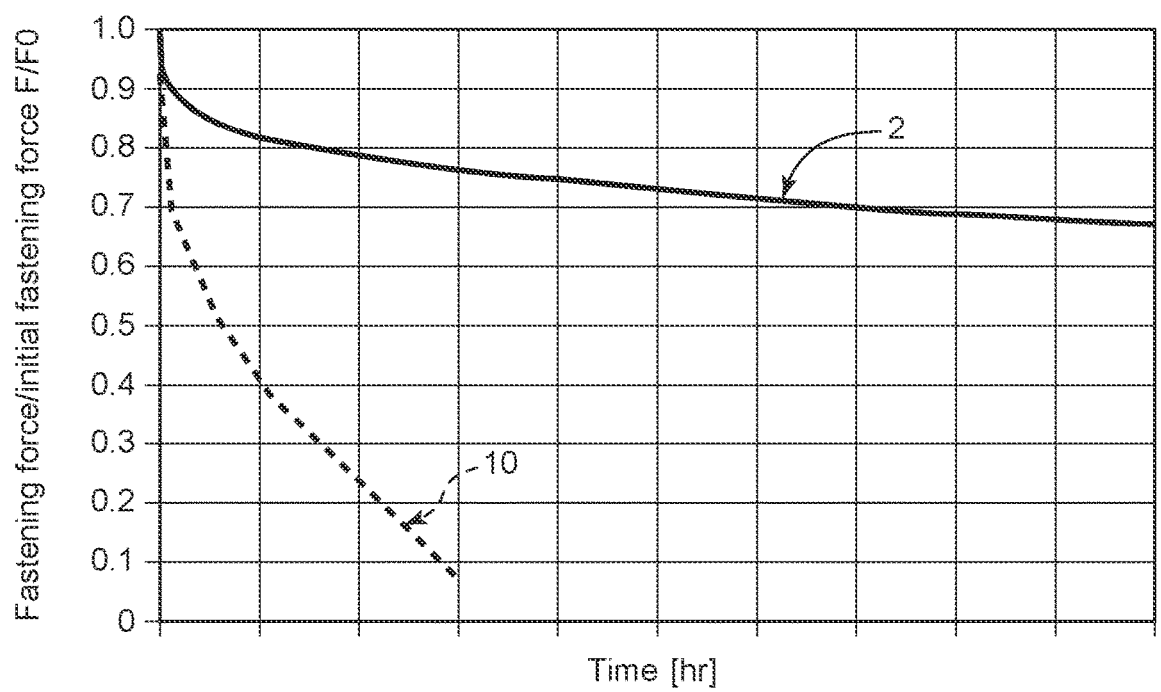
FIG. 7 is a graph showing change in fastening force, with respect to a rotational shaft, of a compressor wheel according to an embodiment of the present invention over time, in comparison with a compressor wheel according to comparative example.

FIG. 7 is a graph showing change in fastening force, with respect to a rotational shaft, of a compressor wheel according to an embodiment of the present invention over time, in comparison with a compressor wheel according to comparative example. In the graph shown in FIG. 7, the horizontal axis represents the rotational drive time of the compressor wheel, and the vertical axis represents the fastening force F of the compressor wheel as a ratio to initial fastening force F0 when the rotational driving time is zero. As with FIG. 6, the compressor wheel 2 including the thermal insulating coating layer 6 is indicated by the solid line in FIG. 7, and the compressor wheel 10 according to comparative example composed of the compressor wheel body 3 not including the thermal insulating coating layer 6 is indicated by the dotted line in FIG. 7. The compressor wheel 2 can suppress the reduction in fastening force for a long period compared with the compressor wheel 10 according to the comparative example.

As described above, the compressor wheel 2 according to some embodiments includes, as shown in FIG. 1, the compressor wheel body 3 and the thermal insulating coating layer 6.

In the above configuration, the compressor wheel 2 includes the compressor wheel body 3 and the thermal insulating coating layer 6 disposed so as to cover at least a part of the back surface 30 of the compressor wheel body 3. Thus, even when the air around the back surface 20 of the compressor wheel 2 is heated to very high temperature due to heat generated by friction between the compressor wheel 2 and the air around the back surface 20 of the compressor wheel 2 as a result of high-speed rotation of the compressor wheel 2, the thermal insulating coating layer 6 reduces input of heat from the back surface 30 of the compressor wheel body 3. Further, since the heat input from the back surface 30 of the compressor wheel body 3 is reduced, the temperature increase of the compressor wheel body 3 is suppressed. Thus, it is possible to suppress creep damage of the compressor wheel 2 and the reduction in fastening force.

Further, as described above, in some embodiments, the compressor wheel body 3 is made of aluminum or an aluminum alloy. In this case, since the compressor wheel body 3 is made of aluminum or an aluminum alloy, the compressor wheel body is light compared with that made of other materials such as iron. On the other hand, when the temperature of the compressor wheel body 3 made of aluminum or an aluminum alloy becomes higher than, for example, 200° C., creep damage and the reduction in fastening force may become remarkable, and the compressor wheel body 3 may be damaged. In this regard, the thermal insulating coating layer 6 suppresses the temperature increase of the compressor wheel body 3, so that it is possible to prevent damage to the compressor wheel body 3.

Further, as described above, in some embodiments, the thermal insulating coating layer 6 is disposed outside of two-thirds of the external dimension D of the back surface 30 of the compressor wheel body 3 in a direction perpendicular to the axial direction of the compressor wheel 2. In this case, the portion located outside of two-thirds of the external dimension D of the back surface 30 of the compressor wheel body 3 is where the temperature remarkably increases due to heat input from the air around the back surface 20 of the compressor wheel 2, but the thermal insulating coating layer is disposed on this portion, so that it is possible to effectively reduce heat input from the back surface 30 of the compressor wheel body 3.

Figure 8:
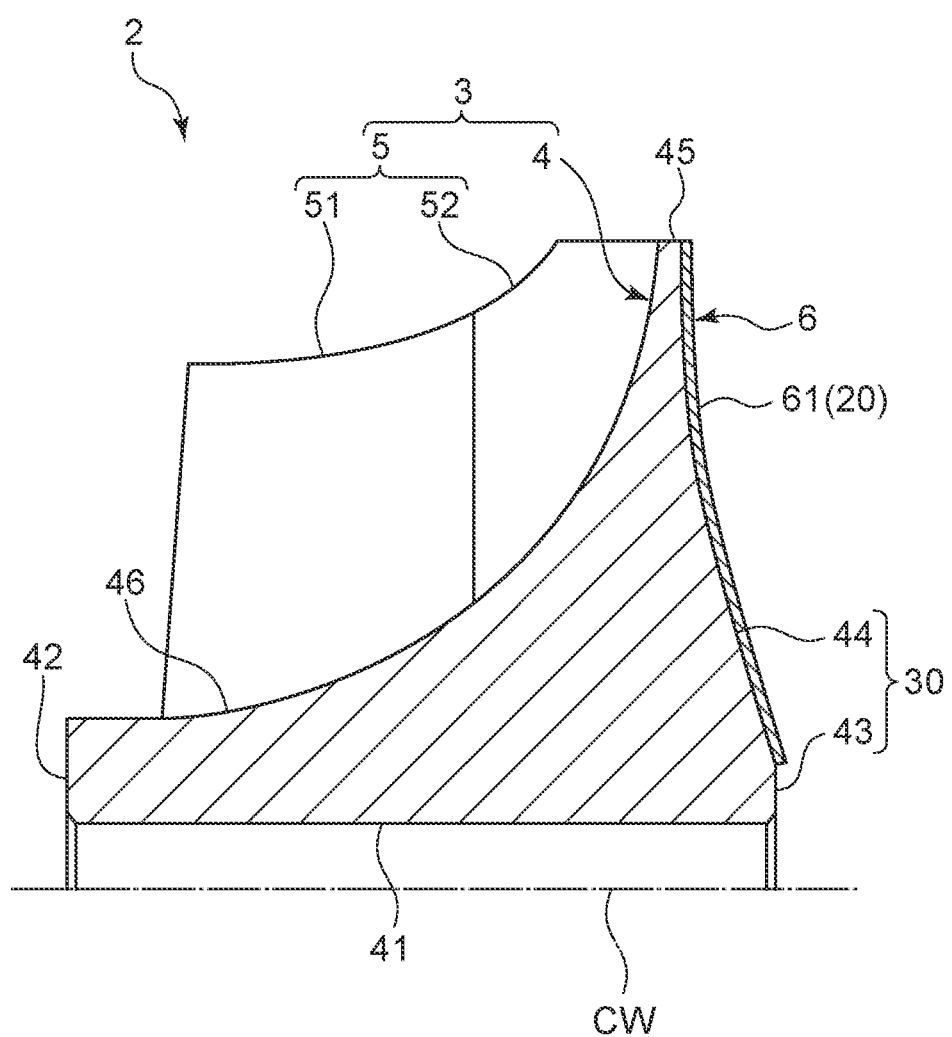
FIG. 8 is a schematic half cross-sectional view of a compressor wheel taken along the axial direction of the compressor wheel for describing the compressor wheel according to another embodiment of the present invention.

FIG. 8 is a schematic half cross-sectional view of a compressor wheel taken along the axial direction of the compressor wheel for describing the compressor wheel according to an embodiment of the present invention. As shown in FIG. 8, in some embodiments, the back surface 30 includes the flat surface 43, and the flat surface 43 includes the contact portion 431 configured to come into contact with the retaining portion 71 of the rotational shaft 7 when the compressor wheel 2 is attached to the rotational shaft 7.

Further, the thermal insulating coating layer 6 is disposed on the entire back surface 30 except the flat surface 43. In other words, the thermal insulating coating layer 6 is disposed on the entire back-side inclined surface 44, as shown in FIG. 8. In this case, since the thermal insulating coating layer 6 is disposed on not only the portion where the temperature remarkably increases due to heat input from the air around the back surface 20 of the compressor wheel 2 but over the entire back surface 30 except the flat surface 43, it is possible to reliably reduce heat input from the back surface 30 of the compressor wheel body 3.

As described above, in some embodiments, for the thermal insulating coating layer 6, a resin material excellent in thermal insulating property but relatively inexpensive and easily available is used. More specifically, the material of the thermal insulating coating layer 6 includes glass balloon, calcium silicate, or silicone varnish. Further, as described above, in some embodiments, the thermal insulating coating layer 6 has a thermal conductivity of equal to or less than 2.0 W/mK. The thermal insulating coating layer 6 preferably has a thermal conductivity of equal to or less than 1.0 W/mK, more preferably equal to or less than 0.5 W/mK. With this configuration, since the thermal conductivity of the thermal insulating coating layer 6 is equal to or less than 2.0 W/mK, it is possible to effectively reduce heat input from the back surface 30 of the compressor wheel body 3. Further, it is possible to prevent the thickness of the thermal insulating coating layer 6 from increasing. The heat resistant temperature of the thermal insulating coating is preferably 300° C. or higher.

As described above, the supercharger 1 according to some embodiments includes the compressor wheel 2 described above, the rotational shaft 7 having a longitudinal direction, having one end in the longitudinal direction inserted in the through hole 41 formed in the compressor wheel 2 from the back surface 20 of the compressor wheel 2, and having the retaining portion 71 in contact with the back surface 20 of the compressor wheel 2, the retaining member 8 retained by the one end of the rotational shaft 7 so that the compressor wheel 2 is clamped between the retaining member 8 and the retaining portion 71, and the compressor cover 9 accommodating the compressor wheel 2.

In the above configuration, the compressor wheel 2 of the supercharger 1 is clamped between the retaining portion 71 of the rotational shaft 7 and the retaining member 8, and is accommodated in the compressor cover 9. In such a compressor wheel 2, when the temperature of the compressor wheel body 3 becomes higher than, for example, 200° C., the reduction in force for clamping the compressor wheel 2 between the retaining portion 71 of the rotational shaft 7 and the retaining member 8 (fastening force) and creep damage may become remarkable, and the compressor wheel body 3 may be damaged. In this regard, the thermal insulating coating layer 6 suppresses the temperature increase of the compressor wheel body 3, so that it is possible to prevent damage to the compressor wheel body 3.

In the above-described embodiments, the turbocharger 1A for an automobile has been described as an example of the supercharger 1, but the supercharger 1 is not limited to the turbocharger 1A for an automobile, and various modifications can be made. For example, the supercharger 1 may be a turbocharger for a ship, or may be a device other than the turbocharger. Further, the supercharger 1 may not include the turbine wheel 11 and the turbine housing 12. As an example of the supercharger 1 not including the turbine wheel 11 and the turbine housing 12, there may be mentioned an electric compressor that rotates the compressor wheel 2 by an electric motor not depicted.

Further, although in the above-described embodiments, the compressor wheel body 3 is made of aluminum or an aluminum alloy, the compressor wheel body 3 may be made of other materials. However, the material of the compressor wheel body 3 preferably has high strength and high stiffness but light weight.

Although in the above-described embodiments, the compressor blade 5 includes two types of blades (full blade 51 and splitter blade 52), the blade may include only one of the full blade 51 or the splitter blade 52.

The present invention is not limited to the embodiments described above, but includes modifications to the embodiments described above, and embodiments composed of combinations of those embodiments.

REFERENCE SIGNS LIST

1 Supercharger
1A Turbocharger
2 Compressor wheel
20 Back surface
3 Compressor wheel body
30 Back surface
4 Hub
41 Through hole
42 Tip surface
43 Flat surface
431 Contact portion
44 Back-side inclined surface
45 Outer surface
46 Blade-side inclined surface
5 Compressor blade
51 Full blade
52 Splitter blade
6 Thermal insulating coating layer
7 Rotational shaft
71 Retaining portion
72 Male thread portion
8 Retaining member
81 Retaining surface
82 Female thread portion
9 Compressor cover
91 Air inlet
92 Compressor flow passage
93 Diffuser
94 Shroud portion
10 Compressor wheel according to comparative example
11 Turbine wheel
12 Turbine housing
13 Bearing
14 Bearing housing
D External dimension of compressor wheel body
A1 High-temperature region of air
A2, A3 Quasi-high-temperature region of air
M1 High-temperature region of compressor wheel body
M2 Quasi-high temperature region of compressor wheel body

The invention claimed is:

1. A compressor wheel comprising:
a compressor wheel body; and
a thermal insulating coating layer disposed so as to cover at least a part of a back surface, in contact with air, of the compressor wheel body,
wherein the thermal insulating coating layer is disposed outside of two-thirds of an external dimension of the back surface of the compressor wheel body in a direction perpendicular to an axial direction of the compressor wheel,
wherein the back surface of the compressor wheel body includes a flat surface including a contact portion configured to come into contact with a retaining portion of a rotational shaft when the compressor wheel is attached to the rotational shaft, and
wherein a boundary between the thermal insulating coating layer and the back surface on which the thermal insulating coating layer is not disposed is located at or outside of two-thirds of the external dimension of the back surface of the compressor wheel body in the direction perpendicular to the axial direction of the compressor wheel.

2. The compressor wheel according to claim 1,
wherein the compressor wheel body is made of aluminum or an aluminum alloy.

3. The compressor wheel according to claim 1,
wherein the thermal insulating coating layer is made of a resin.

4. The compressor wheel according to claim 1,
wherein the thermal insulating coating layer has a thermal conductivity of equal to or less than 2.0 W/mK.

5. A supercharger comprising:
the compressor wheel according to claim 1;
a rotational shaft having a longitudinal direction, one end of the rotational shaft in the longitudinal direction being inserted in a through hole formed in the compressor wheel from the back surface of the compressor wheel, the rotational shaft having a retaining portion in contact with the back surface of the compressor wheel;
a retaining member retained by the one end of the rotational shaft so that the compressor wheel feel is clamped between the retaining member and the retaining portion; and
a compressor cover accommodating the compressor wheel.

* * * * *